(12) United States Patent
Schwartz et al.

(10) Patent No.: US 6,384,373 B1
(45) Date of Patent: May 7, 2002

(54) WELDING POWER SUPPLY HAVING IMPROVED SUPPLEMENTAL POWER CIRCUIT

(75) Inventors: Brian A. Schwartz, Appleton; Steven J. Geissler, Little Chute, both of WI (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 09/678,270

(22) Filed: Oct. 3, 2000

(51) Int. Cl.$^7$ .................................................. B23K 9/10
(52) U.S. Cl. ................................................... 219/130.1
(58) Field of Search ......................... 219/130.1, 130.21, 219/130.31, 130.32, 130.33, 137 PS, 130.51

(56) References Cited

U.S. PATENT DOCUMENTS

| | | | | |
|---|---|---|---|---|
| 2,472,323 A | * | 6/1949 | Welch, Jr. ............... | 219/130.51 |
| 2,697,160 A | * | 12/1954 | Williams ................ | 219/130.51 |
| 4,517,439 A | * | 5/1985 | Colley .................. | 219/137 PS |
| 5,218,182 A | * | 6/1993 | Vogel et al. ........... | 219/130.32 |
| 5,683,602 A | * | 11/1997 | Stava ................... | 219/137 PS |

\* cited by examiner

Primary Examiner—Clifford C. Shaw
(74) Attorney, Agent, or Firm—Foley & Lardner

(57) ABSTRACT

A power circuit for a welding power supply includes a control circuit, a power conversion circuit, a filter circuit, and a supplemental power circuit. The control circuit is configured to provide control signals to the power conversion circuit. The power conversion circuit is configured to generate a welding power based on the control signals. The filter circuit is configured to filter the welding power and to provide the filtered welding power at a welding output. The supplemental power circuit is configured to provide a supplemental power, wherein the supplemental power circuit is coupled across the filter circuit such that the filter circuit filters the supplemental power.

20 Claims, 2 Drawing Sheets

WELDING POWER SUPPLY HAVING IMPROVED SUPPLEMENTAL POWER CIRCUIT

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to welding power supplies. More specifically, the present invention relates to power circuits for welding power supplies having a supplemental welding power.

BACKGROUND OF THE INVENTION

Welding power supplies are typically stand-alone units which receive a standard line voltage and provide a usable welding power at a welding output. The welding power may be alternating current (AC) or direct current (DC), constant current or constant voltage, three-phase or single-phase, and may include a wide range of amperages, depending upon operator-selected inputs. Various power and control circuitry is used to shape and time the welding power based upon the operator-selected inputs.

Some welding power supplies are preferably configured for both AC and DC welding power applications. These power supplies provide additional versatility to the operator. However, configuring power circuitry for both applications in a single unit is a design challenge.

FIG. 1 illustrates a standard topology of a power circuit for providing a DC welding power. Power circuit 10 includes a transformer 12 for receiving power from AC source 14 and providing it to a bridge rectifier 16 having a plurality of SCRs in a bridge configuration. A control circuit (not shown) provides control signals to the gates of the SCRs. The control signals cause the SCRs to fire in such a way that a full-wave rectified signal is provided. The full-wave rectified signal is provided through an inductor 18 to a weld output 20, and ultimately to an electrode and workpiece. During some low-power DC welding processes (typically when the output current is 15 amperes or less), the welding power may become discontinuous, which may cause the welding arc to extinguish. Accordingly, a supplemental power source or background circuit 22 is provided. Background circuit receives power from transformer 12, rectifies the power, filters the power with capacitor 24, and provides the power as a supplemental power to weld output 20. The supplemental power helps to maintain the welding arc during the low amperage condition by providing a smooth DC output at approximately 3 Amps that combines with the current from rectifier 16 and inductor 18.

One drawback of this topology is that a large capacitor 24 is required to smooth the supplemental welding power. Capacitor 24, typically a large, electrolytic capacitor, is costly.

During an AC configuration, a switch reconfigures the connectors of circuit 10 in such a way that the supplemental power circuit is rendered useless. However, it would be advantageous to provide a supplemental power at inductor 18 during an AC operation to allow for better weld puddle control when welding with an AC squarewave at low currents.

Accordingly, there is a need for a power circuit having a supplemental power source operable during an AC welding operation. Further, there is a need for a simplified supplemental power circuit which provides a supplemental welding power with fewer electrical components than existing topologies. Further still, there is a need for a supplemental power circuit which need not be disabled or enabled based upon the welding operation. The teachings hereinbelow extend to those embodiments which fall within the scope of the appended claims, regardless of whether they accomplish one or more of the above needs.

SUMMARY OF THE INVENTION

According to an exemplary embodiment, a power circuit for a welding power supply includes a control circuit, a power conversion circuit, a filter circuit, and a supplemental power circuit. The control circuit is configured to provide control signals to the power conversion circuit. The power conversion circuit is configured to generate a welding power based on the control signals. The filter circuit is configured to filter the welding power and to provide the filtered welding power at the welding output. The supplemental power circuit is configured to provide a supplemental power. The supplemental power circuit is coupled across the filter circuit such that the filter circuit filters the supplemental power.

According to another exemplary embodiment, a welding power supply includes a transformer, a control circuit, a power conversion circuit, a filter circuit, and a supplemental power circuit. The control circuit is configured to provide control signals. The power conversion circuit is configured to receive an input power from the transformer and to receive the control signals. The power conversion circuit generates an AC welding power at a welding output based on the control signals. The supplemental power circuit is coupled to the filter circuit and is configured to provide a supplemental power to the filter circuit.

According to yet another exemplary embodiment, a method of providing welding power includes providing control signals to a power conversion circuit, generating an AC welding power based on the control signals, generating a supplemental welding power, and providing the supplemental welding power with the AC welding power at a filter device.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE INVENTION

Figure 2:
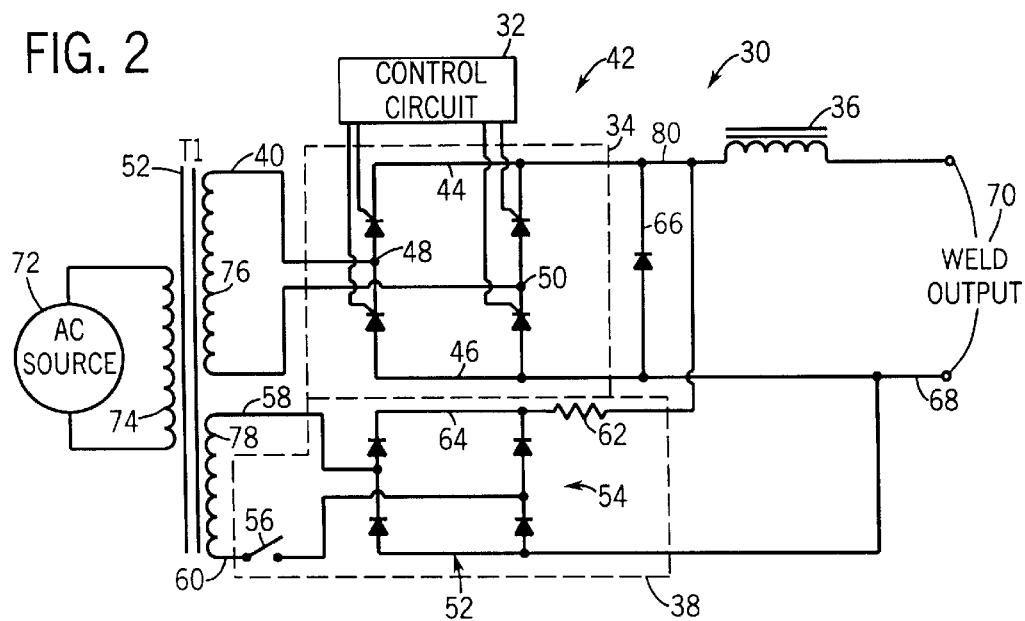
FIG. 2 is a power circuit according to an exemplary DC welding power embodiment.

FIG. 2 illustrates a power circuit 30 for a welding power supply according to an exemplary DC welding power embodiment. Power circuit 30 is suitable for use in any type of welding power supply, including a tungsten inert gas (TIG)/Stick power supply, such as, the Sycrowave 350 LX, manufactured by Miller Electric Mfg. Co., Appleton, Wisconsin. Alternatively, power circuit 30 may be used in a wire feed power supply, an oxyacetylene power supply, a plasma cutter, etc., and is suitable for three-phase and single-phase power supplies, constant current and constant voltage power supplies, etc. However, power circuit 30 is particularly advantageous in a power supply suitable for both AC and DC welding operations.

Power circuit 30 includes a control circuit 32, a main or primary power conversion circuit 34, a filter circuit 36, and a supplemental power circuit 38. Control circuit 32 is a microprocessor in this exemplary embodiment, but may alternatively include a programmable logic device, digital or analog control circuitry, discrete circuit elements, or other control elements. Power conversion circuit 34 converts an input power received on line 40 to a welding power signal. In this exemplary embodiment, power conversion circuit 34 includes a bridge rectifier circuit having a plurality of switches 42. Switches 42 are silicon-controlled rectifiers, but may alternatively be other switches, such as, a transistor, an insulated-gate bipolar transistor (IGBT), a gate turn-off thyristor (GTO), a MOS-controlled thyristor (MCT), etc. Each of switches 42 includes a gate terminal coupled to control circuit 32. Switches 42 are in a bridge rectifier configuration, wherein a first node 44 couples the cathode of two of switches 42 together and a second node 46 couples the anodes of another two of switches 42 together. Further, a third node 48 is coupled between an anode one of switches 42 and a cathode of another of switches 42, and a fourth node 50 is likewise coupled to an anode of a third of switches 42 and a cathode of a fourth of switches 42.

Filter circuit 36 is an inductor suitable for smoothing a full-wave rectified signal to provide welding power at a welding output. Filter circuit 36 may alternatively be other filtering elements. In an exemplary embodiment, welding power may be provided at between 3 and 400 Amps with a maximum open-circuit voltage of 80 Volts. Other welding power ranges are contemplated.

Supplemental power circuit 38 includes a full-wave bridge rectifier 54 comprising four rectifiers 54 in a standard bridge configuration. In this exemplary embodiment, rectifiers 54 include diodes. Supplemental power circuit 38 further includes a switch 56 coupled between an input line 60 (or an input line 58) and bridge rectifier 52. Switch 56 is configured to turn supplemental power circuit 38 on or off in a selective manner, and may be controlled by control circuit 32. A resistor 62 is coupled between power conversion circuit 34 and a node 64 of bridge rectifier 52, node 64 being shared by the cathodes of two of rectifiers 54. Further, a freewheeling diode 66 is coupled between switches 42 and filter circuit 36, having an anode coupled to a terminal 68 of weld output 70 and a cathode coupled between power conversion circuit 34 and filter circuit 36.

In operation, transformer 52 receives power from AC power source 72 at a primary coil 74 and induces a corresponding current in secondary coil 76 and secondary coil 78. An input power is provided via line 40 to power conversion circuit 34. Control circuit 32 fires switches 42 to provide a DC welding power output. Filter circuit 36 filters the full-wave rectified signal from power conversion circuit 34 and provides it to welding output 70. Freewheeling diode 66 conducts freewheeling currents from filter circuit 36.

Figure 1:
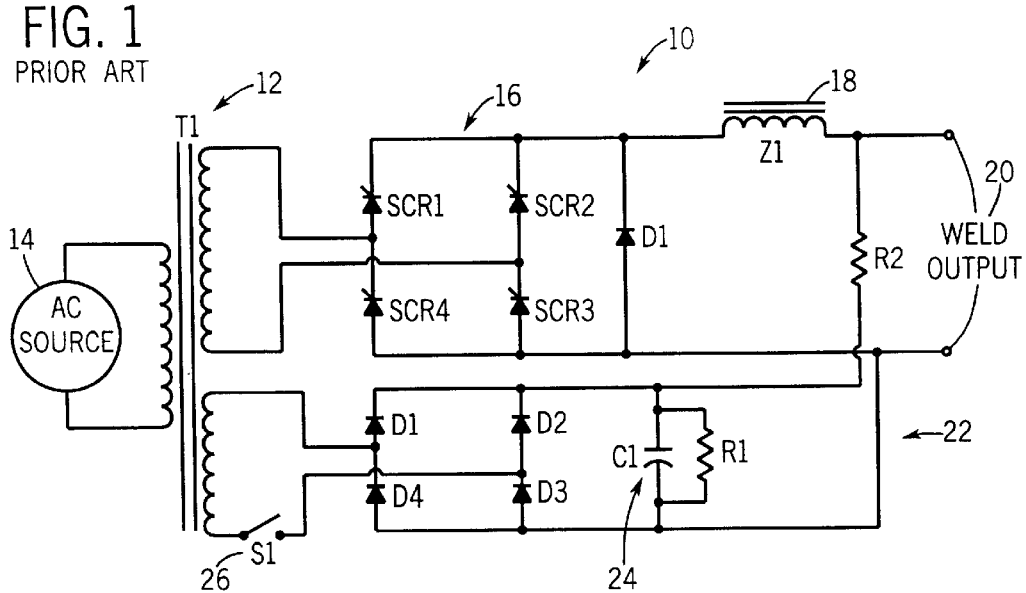
FIG. 1 is a schematic diagram of a power conversion circuit according to the prior art.

During DC operation, control circuit 32 provides a signal to switch 56 to close the switch to enable the current induced in input line 58 to be rectified by switches 54 and passed through resistor 62. Thus, supplemental power circuit 38 provides a background current (e.g., approximately 3 Amps DC). Advantageously, no filter capacitor is needed in supplemental power circuit 38 since the supplemental power is provided to filter circuit 36 (via node 80) to weld output 70. Thus, the supplemental power is combined with the main welding power from power conversion circuit 34 before filtering. In other words, the injection point of the supplemental power from supplemental power circuit 38 is moved to a point in power circuit 30 before filter circuit 36, thereby allowing the elimination of a large electrolytic capacitor from the standard topology of FIG. 1. This provides an advantageous cost reduction for power circuit 30.

Figure 3:
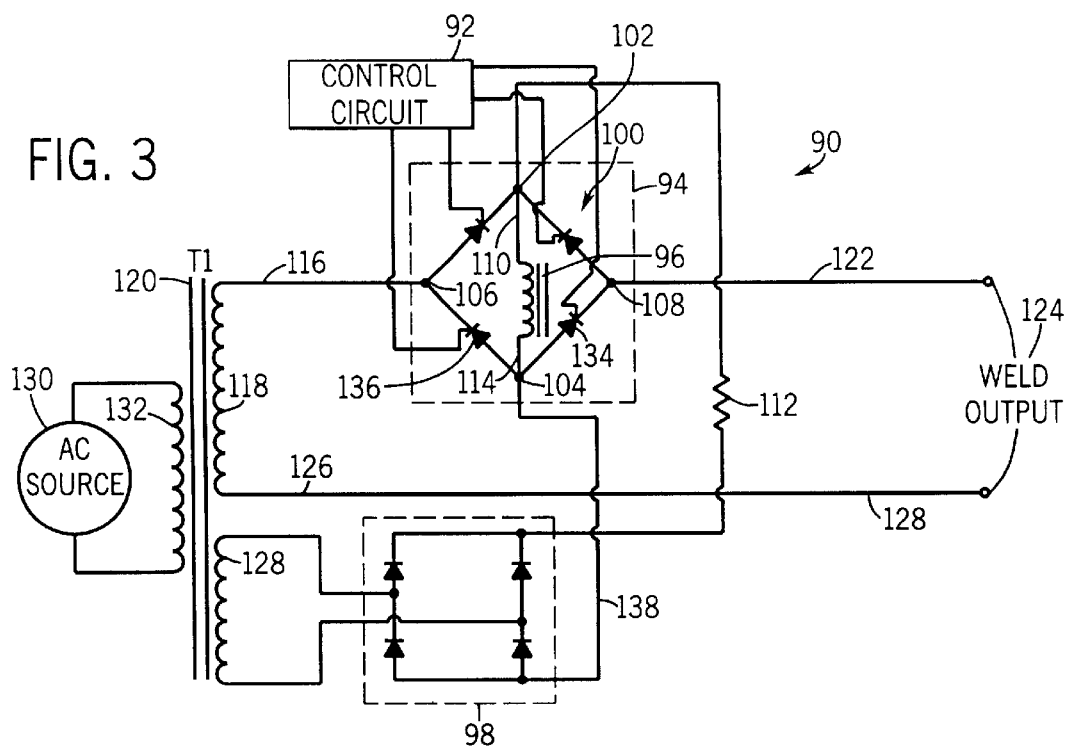
FIG. 3 is a power circuit according to an exemplary AC welding power embodiment.

Referring now to FIG. 3, a power circuit 90 is shown according to another exemplary embodiment. Power circuit 90 includes a control circuit 92, a power conversion circuit 94, a filter circuit 96, and a supplemental power circuit 98. Power conversion circuit 94 includes a plurality of switches 100 (e.g., SCRs) in a fullwave bridge rectifier configuration having a first node 102, a second node 104, a third node 106 and a fourth node 108. First node 102 couples the cathodes of two of switches 100 together, to a first terminal 110 of filter circuit 96, and to supplemental power circuit 98 through a resistor 112. Second node 104 couples the anodes of two other of switches 100 together, to a second terminal 114 of inductor 96, and to supplemental power circuit 98. Third terminal 106 couples the cathode of one of switches 100 to the anode of another of switches 100 and to one terminal 116 of a secondary coil 118 of a transformer 120. Fourth node 108 is coupled to a first terminal 122 of a weld output 124. A second terminal 126 of secondary coil 118 is coupled to a second terminal 128 of weld output 124.

Supplemental power circuit 98 includes a full-wave bridge rectifier comprising four diodes in a standard bridge configuration for full-wave rectifying an input power received on a secondary coil 128 of transformer 120. Supplemental power circuit 98 provides the full-wave rectified signal through resistor 112 to first node 102 of power conversion circuit 94.

In operation, power from an AC source 130 is provided to a primary coil 132 of transformer 120, which induces currents in the form of input powers in secondary coils 118 and 128. Control circuit 92 fires switches 100 according to a predetermined program to provide an AC welding power through filter circuit 96 to weld output 124. Supplemental power circuit 98 rectifies the input power from secondary coil 128 and provides a supplemental power through resistor 112 to node 102. This supplemental power source is filtered by filter 96. An output terminal 138 of supplemental power circuit 98 is coupled to node 104.

In power circuit 90, when control circuit 92 controls power conversion circuit 94 to provide an AC welding power output at low current, the supplemental power provided by supplemental power circuit 98 provides additional current, resulting in continuous current flow through filter circuit 96. The fact that current through filter circuit 96 avoids reading 0 Amps allows better weld puddle control when welding in the AC squarewave mode with low current.

While the exemplary embodiments illustrated in the FIGS. and described above are presently preferred, it should be understood that these embodiments are offered by way of example only. For example, while the exemplary power conversion circuits illustrated in FIGS. 2 and 3 utilize full-wave bridge rectifiers, other power conversion elements are contemplated, such as, single diode or switch arrangements, relays, and other power switching devices. Further, other circuit arrangements are contemplated for providing a supplemental current during an AC welding process. Accordingly, the present invention is not limited to a particular embodiment, but extends to various modifications that nevertheless fall within the scope of the appended claims.

What is claimed is:

1. A power circuit for a welding power supply, comprising:
   a control circuit configured to provide control signals;
   a power conversion circuit configured to receive the control signals and to generate an AC welding power based on the control signals;
   a filter circuit configured to filter the welding power and to provide the filtered welding power at a welding output; and
   a supplemental power circuit configured to provide a supplemental power, wherein the supplemental power circuit is coupled across the filter circuit such that the filter circuit filters the supplemental power.

2. The power circuit of claim 1, wherein the control circuit is configured to control the power conversion circuit to provide DC welding power in a DC mode.

3. The power circuit of claim 1, wherein the supplemental power circuit includes a first terminal coupled between the power conversion circuit and the filter circuit and a second terminal coupled to a terminal of the welding output.

4. The power circuit of claim 1, wherein the filter circuit includes an inductor.

5. The power circuit of claim 1, wherein the power conversion circuit includes a bridge rectifier having a plurality of silicon-controlled rectifiers.

6. The power circuit of claim 1, wherein the supplemental power circuit is free of capacitors.

7. The power circuit of claim 1, wherein the power conversion circuit includes at least four SCRs in a bridge rectifier configuration, further comprising an inductor coupled between a first node shared by the cathodes of two SCRs and a second node shared the anodes of two SCRs.

8. The power circuit of claim 7, wherein the supplemental power circuit includes a first terminal coupled to the first node, a second terminal coupled to the second node, a rectifier, and a resistor coupled between the rectifier and the first terminal.

9. The power circuit of claim 7, wherein a positive terminal of the welding output is coupled to a third node shared by an anode of a first SCR and a cathode of a second SCR and a negative terminal of the welding output is coupled through a primary coil to a fourth node shared by an anode of a third SCR and a cathode of a fourth SCR.

10. A welding power supply, comprising:
    a transformer;
    a control circuit configured to provide control signals;
    a power conversion circuit configured to receive an input power from the transformer and to receive the control signals, wherein the power conversion circuit generates an AC welding power at a welding output based on the control signals;
    a filter circuit configured to filter the welding power and to provide the filtered welding power at a welding output; and
    a supplemental power circuit coupled to the filter circuit configured to provide a supplemental power to the filter circuit.

11. The welding power supply of claim 10, wherein the supplemental power circuit provides a DC supplemental power to the filter circuit.

12. The welding power supply of claim 10, wherein the power conversion circuit includes at least four SCRs in a bridge rectifier configuration, further comprising a filter circuit coupled between a first node shared by the cathodes of two SCRs and a second node shared the anodes of two SCRs.

13. The welding power supply of claim 12, wherein the filter circuit includes an inductor.

14. The welding power supply of claim 10, wherein the supplemental power circuit is coupled to a secondary coil of the transformer.

15. A method of providing welding power, comprising:
    providing control signals to a power conversion circuit;
    generating an AC welding power based on the control signals;
    generating a supplemental welding power; and
    providing the supplemental welding power with the AC welding power at a filter device.

16. The method of claim 15, wherein the filter device is an inductor.

17. The method of claim 15, further comprising filtering the welding power and supplemental welding power with the same filter device.

18. The method of claim 17, further comprising, in a DC mode:
    generating a DC welding power based on the control signals; and
    providing the supplemental welding power with the DC welding power at a welding output.

19. The method of claim 15, further comprising rectifying an input power to provide the supplemental power signal.

20. The method of claim 15, wherein the filtered welding power and supplemental power are combined at the filter device, with the welding power provided directly to a welding output.

* * * * *